Jan. 25, 1938.  F. A. FAVILLE  2,106,170
METHOD OF TESTING LUBRICANTS
Filed April 20, 1936   3 Sheets-Sheet 3
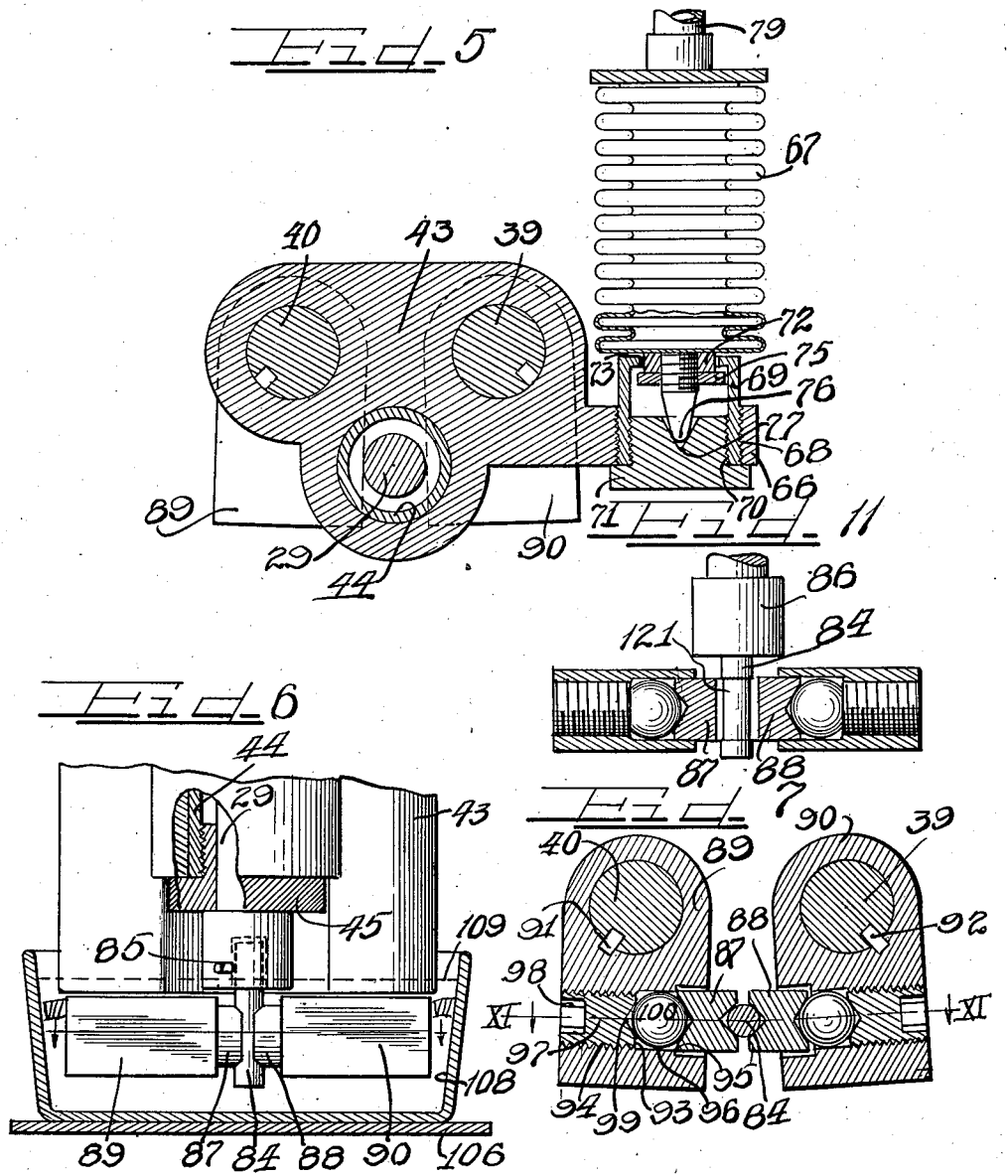
Inventor
Frederick A. Faville
By Charles W. Fields Attys.

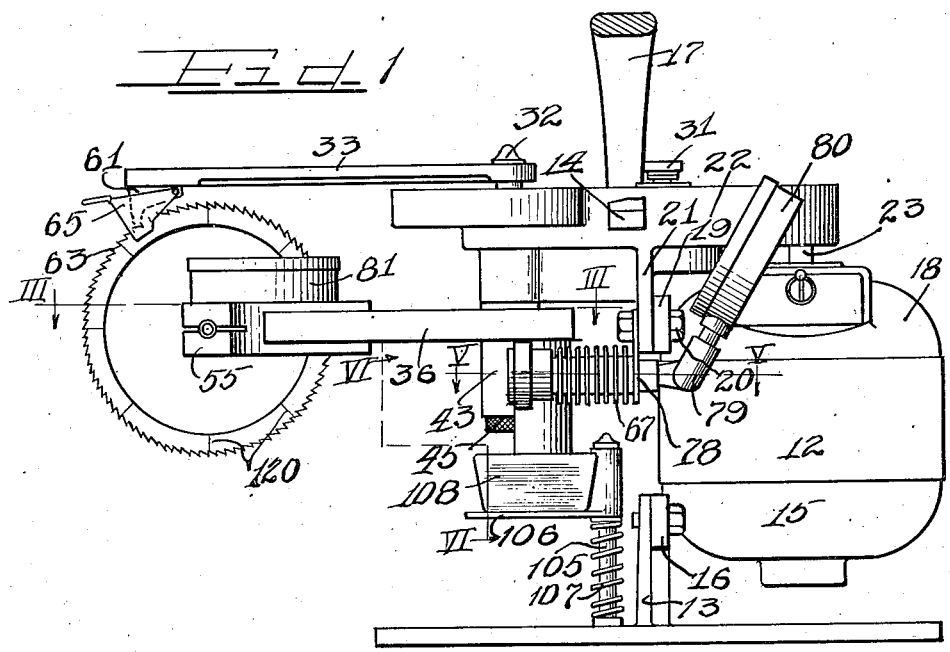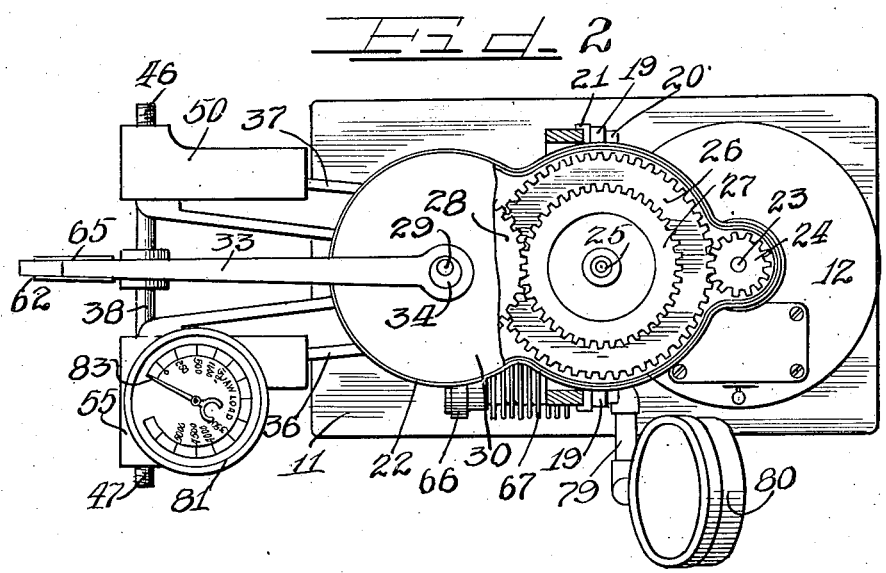

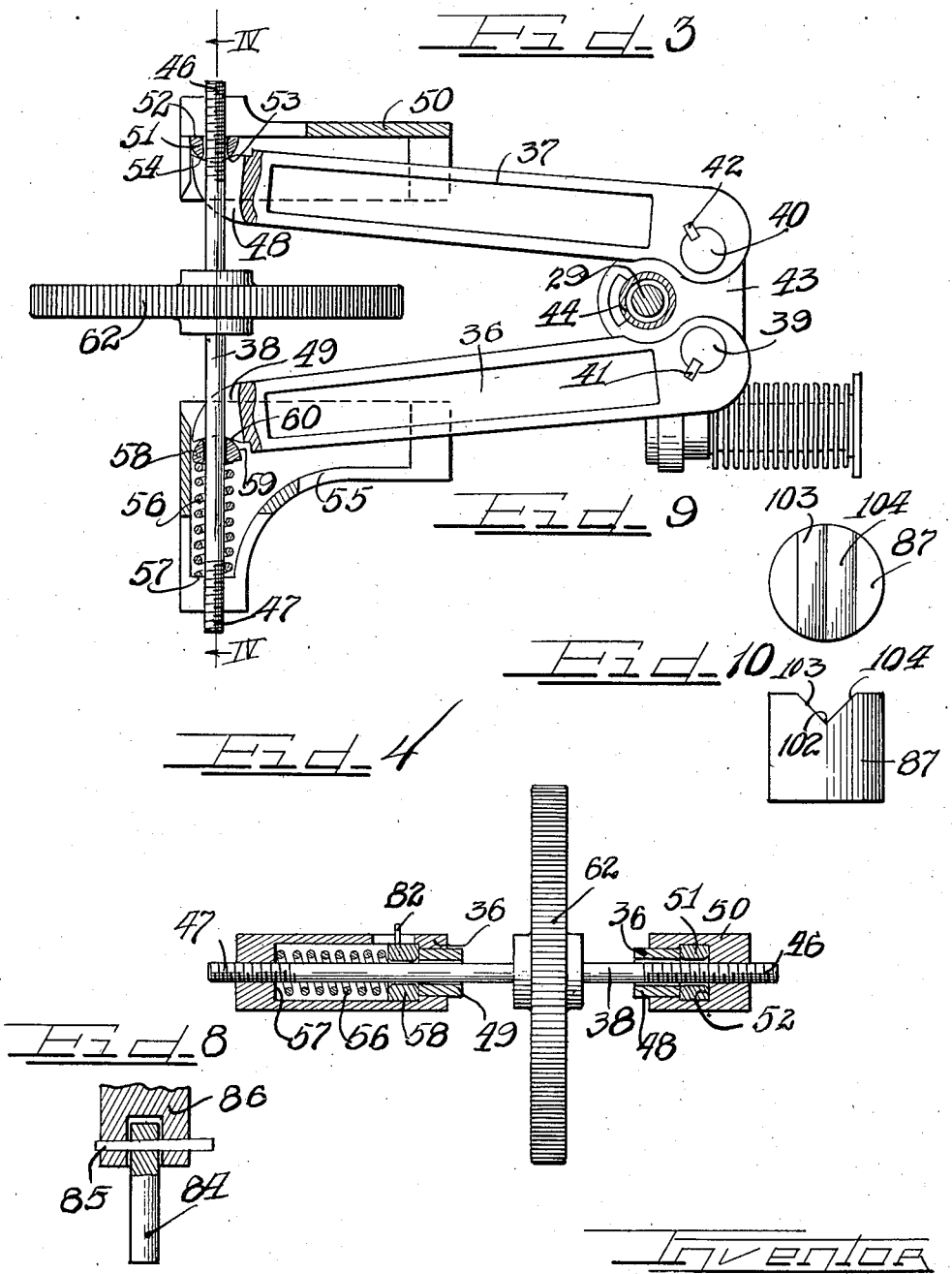

Patented Jan. 25, 1938

2,106,170

UNITED STATES PATENT OFFICE 2,106,170

METHOD OF TESTING LUBRICANTS

Frederick A. Faville, Chicago, Ill.

Application April 20, 1936, Serial No. 75,323

4 Claims. (Cl. 73—51)

This invention relates to a method of testing lubricants and more particularly to a method wherein the rate of wear between standard bearing surfaces for any given lubricant having extreme pressure, or so-called E. P. value, may be determined directly as the test proceeds and without the necessity of stopping the test or waiting until the end of the test period to measure the amount of wear by the use of micrometers or a balance.

The type of machine that I have found suitable for carrying out my method of testing lubricants for E. P. value is that described in the Mead Cornell application entitled "Oil testing machine", Serial No. 17,581, filed April 22, 1935. The present method constitutes an improvement, or advance over the method described in that application in that the present method permits a study of the qualities of a given lubricant, as well as a direct comparison between different lubricants, during the test period after the full fluid film of the lubricant has been broken and wear of the bearing surfaces occurs. My present method also provides means for directly determining the amount of wear of the bearing surfaces during this period, and therefore the rate of wear.

It is therefore an important object of this invention to provide a method of testing lubricants whereby the E. P. quality of a given lubricant may be determined during the period of pronounced wear between the bearing surfaces and after the full fluid film of the lubricant has been ruptured.

It is a further important object of this invention to provide a method for obtaining a direct reading of the amount of wear between bearing surfaces under constant load during the testing of a given lubricant and without interrupting the test or waiting until the end of the test period to measure the amount of wear.

It is a further important object of this invention to provide a method for the direct comparison of different lubricants, including a method wherein different lubricants are diluted with an inert oil having no E. P. value, so that standards can be set up for the grading of E. P. lubricants and oils may be compounded to produce products of the desired E. P. values.

Other and further important objects of this invention will become apparent from the following description and appended claims.

My invention is best illustrated by reference to the accompanying drawings.

On the drawings:

Figure 1 is a side elevation of a lubricant testing machine of a type suitable for use in the carrying out of the method embodying the principles of my invention.

Figure 2 is a top plan view of the same, with parts broken away to show the driving gears.

Figure 3 is an enlarged sectional view taken substantially on line III—III of Fig. 1, with parts in elevation.

Figure 4 is a sectional view taken substantially on line IV—IV of Fig. 3, with parts in elevation.

Figure 5 is an enlarged sectional view taken substantially on line V—V of Fig. 1, with parts omitted.

Figure 6 is a fragmentary, enlarged view, taken substantially along the line VI—VI of Fig. 1, with parts in section.

Figure 7 is a sectional view taken substantially along the line VII—VII of Fig. 6, with parts in elevation.

Figure 8 is an enlarged detail view of the bearing pin assembly.

Figures 9 and 10 are end and elevational views, respectively, of a bearing block used in the machine of the other figures.

Figure 11 is a sectional view of the bearing pin assembly, taken substantially along the line XI—XI of Fig. 7, with parts in elevation and illustrating the wearing of the pin bearing surface.

In order that the method of my invention may be clearly understood, a machine suitable for use in the carrying out of such method will first be described. It will be understood that the machine itself does not constitute a part of the present invention but is described and claimed in the Cornell application above referred to.

In Figs. 1 and 2, the reference numeral 11 indicates a base or supporting stand on which apparatus embodying the principles of my invention is supported. An electric motor 12 is suitably supported from said base 11 by means of a pair of upright members 13—13, to which a lower section 15 of the motor casing is bolted, as at 16—16. An upper section 18 of the motor casing is similarly provided with integrally formed lugs 19—19, which are secured by means of bolts 20—20 to dependent lugs 21—21 formed on a gear casing or housing 22.

Said motor 12 is provided with a drive shaft 23 carrying a pinion gear 24 secured thereto. A stub shaft 25, suitably journaled in the gear casing 22, has secured thereto a pair of gears, comprising a gear 26 meshing with the pinion gear 24 and another gear 27 that meshes with a gear 28 on a stub shaft 29. The gears 27 and 28 are interchangeable, or may be replaced by other pairs of gears of varying numbers of teeth, so that the speed may be varied as desired. Either metal or fiber gears may be used, or combinations thereof, to reduce the noise of the drive mechanism.

A cover plate 30 is adapted to be capped on to the gear housing 22 to enclose the various gears, and for this purpose is provided with apertures for receiving the stub shafts 25 and 29. A removable pin 31 threads into the stub shaft 25 to hold the cover 30 in place. A nut 32 is adapted to be threaded over the upper end of the stub shaft 29 for holding a lever arm 33 in engagement with an eccentric disk 34 mounted on said shaft 29. Said arm 33 may be removed by merely unscrewing the nut 32.

The casing 22 may also be provided with laterally extending lugs 14, with which is engaged a handle or bail 17. The lugs 14 are placed at approximately the center of mass of the apparatus so as to permit the machine to be carried by means of the bail 17.

The bearing load applying mechanism comprises a pair of lever arms 36 and 37, which together constitute a jaw, and a transversely extending shaft 38, by means of which a load is applied to said levers 36 and 37 and by them transmitted to the bearing surfaces. Said lever arms 36 and 37 are securely fixed upon stub shafts 39 and 40, respectively, by means of keys 41 and 42. Said stub shafts 39 and 40 are rotatably disposed within a block or housing 43, which is pivotally mounted upon a cylindrical tube 44 that houses the shaft 29, the upper end of said tube 44 being force fitted or otherwise secured within the casing 22. A knurled bearing collar 45 is threaded into the lower end of the tube 44 to form a bearing support for the block 43.

The transverse shaft 38 is provided with threaded ends 46 and 47 that extend freely through bifurcated ends 48 and 49 on the lever arms 37 and 36, respectively (Fig. 3). The threaded end 46 extends through and is in threaded engagement with a member 50 that partially encloses the end 48 of the lever arm 37. A bearing member 51 having a plane surface 52 for engagement with an inner face of the member 50 and a segmental spherical surface 53 for engagement with a segmental spherical surface in the bifurcated end 48, is disposed between said member 50 and the bifurcated end 48. Said bearing member 51 thus serves to transmit the load to the lever arm 37 without causing binding between the engaging surfaces.

An angular hollow member 55 is positioned on the threaded end 47 in threading engagement therewith and partially enclosing the bifurcated end 49 of the lever 36. A helical spring 56 surrounds the portion of the shaft 38 between an engaging face 57 of the member 55 and a bearing member 58. This bearing member 58 is provided with a segmental spherical surface 59 for engagement with a correspondingly formed surface 60 in the bifurcated end 49. The load is thus applied through the spring 56 and the bearing member 58 to the bifurcated end 49 of the lever 36.

The load applying lever 33 carries at its free end a dog or pawl 61 which is normally in gravity engagement with the teeth 63 of a ratchet wheel 62 fixedly secured on the shaft 38. It will be apparent that when the motor 12 is driven to rotate the shaft 29, the eccentric throw of the disk 34 will effect a reciprocating movement of the load applying arm 33, so that the wheel 62 will be caused to rotate by the engagement between the pawl 61 and the teeth 63. A pivotally mounted trip member 65, positioned adjacent the end of the load applying arm 33 serves for manual adjustment of said arm 33 to swing the pawl 61 out of engagement, or into engagement with the ratchet wheel 62.

The housing 43 (Fig. 5) is provided with a laterally extending eye lug 66 for connection to a sylphon 67. Said eye lug 66 is internally threaded, as at 68, for engagement with the threaded end of a connecting member 69. The connecting member 69 is internally threaded as at 70 to receive a flanged plug 71, which secures the connecting member 69 in the eye lug 66. The sylphon 67 is provided with an end boss 72 that extends through an opening 73 in the connecting member 69. A pressure transmitting plunger 74 is threaded into said end boss 72 and held therein by means of a lock washer 75. Said plunger 74 is provided with a conically shaped, rounded end 76 centered in a conically shaped depression 77 in the plug 70.

The other end of the sylphon 67 passes through a yoke 78 (Fig. 1) suspended from the gear housing 22 by means of one of the bolts 20. A tube 79 connected to the interior of said sylphon 67 extends beyond said yoke 78 to a gauge 80 which is calibrated to read the torque directly in inch pounds. The sylphon 67 and tube 79 are, of course, filled with a fluid, such as oil, glycerine, or the like, for transmitting the pressure to the working mechanism of the gauge 80.

A second gauge 81 is operatively connected to the load applying mechanism by means of a pin 80 82 (Fig. 4) carried by the bearing block 58. Said pin 82 actuates the working mechanism of the gauge 81 to cause the pointer 83 of said gauge to show the jaw load in pounds. Before the spring 56 is inserted in place, it is calibrated to determine the amount of deflection produced by a given load acting to compress the spring. The gauge 81 is correspondingly calibrated to show the load placed upon the jaw arms 36 and 37 and by them transmitted to the bearing surfaces. All deflection of said arms 36 and 37, as by bending, is thus automatically compensated for, since the gauge 81 indicates directly the compressive load put upon the spring 56.

The driven shaft 29 carries at its lower end a bearing pin 84 (Fig. 6) secured therein by means of a shear pin 85 that extends through the apertured end 86 of said shaft 29 and also through an aperture in said bearing pin 84. Pressure is applied to said bearing pin 84 by means of bearing blocks 87 and 88 (Fig. 7) carried by bearing block holders 89 and 90, respectively. Said bearing block holders 89 and 90 are secured, as by means of keys 91 and 92, upon the lower ends of the shafts 40 and 39, respectively.

Since the bearing block holders 89 and 90 are substantially identical, only one of them will be described. The bearing block holder 89, for instance, is provided with a transverse bore 93, which is threaded, as at 94, inwardly from one end and provided with a counter bored socket 95 at the other end, with a connecting smooth bore portion 96. A plug 97 is adapted to be threaded into the threaded bore portion 94 by means of a wrench (not shown) adapted to fit within the polygonal socket 98 in the outer end of the plug. The inner end of said plug 97 is provided with a conical recess 99, which serves to center a ball 100 snugly held within the smooth ball portion 96 and in engagement with said recess 99. The bearing block 87 associated with the bearing block holder 89 is similarly provided with a conically recessed end 101 so as to make the block self-centering about the ball 100. To this end, the block 87 is of slightly smaller dimensions than the counterbored recess 95, thereby permitting the block to be self-adjusting.

Each of the bearing blocks 87 and 88 has a V-shaped notch 102, providing converging plane surfaces 103 and 104 (Figs. 9 and 10) for line engagement with the cylindrical surface of the bearing pin 84. As previously stated, the provision of the conical recesses in the inner ends of the bearing blocks 87 and 88 and of the balls 100 cause the bearing blocks 87 and 88 to be self-adjusting, so that centers of the balls 100 and the axis of the pin 84 will always be in the same plane and the bearing forces acting against the pin 84 consequently will be properly balanced.

Means are provided for maintaining the bearing blocks 87 and 88 and the portion of the bearing pin 84 encompassed thereby beneath the surface of a lubricant to be tested. Such means include a post 105 (Fig. 1) on which is slidably and pivotally supported a platform 106. A spring 107 normally holds the platform 106 in elevated position. On the platform 106 is mounted a tray 108 for containing the lubricant to be tested. The normal level of the lubricant within the tray 108 is indicated by the dotted line 109 (Fig. 6).

In describing my method of testing lubricants on a machine such as here illustrated and described, it will be unnecessary to describe in detail the method of testing a lubricant during the full fluid film period since one such method is given in the Cornell application above referred to. The method of the present invention has to do with the testing of lubricants after the full fluid film of the lubricant has been ruptured during the preliminary test period described in the Cornell application. Consequently, although the preliminary test period will be briefly described herein, it will be understood that the present method has to do principally with the testing of the lubricant during the wear period and after the full fluid film has been broken.

In starting up any test on a machine such as described, the pan 108 is filled with the lubricant to be tested up to the level indicated by the dotted line 109 (Fig. 6), or to such depth as will be sufficient to cover the bearing surfaces with the lubricant. After the blocks 87 and 88 have been positioned in the holders 89 and 90 in bearing engagement with the bearing pin 84, the pan 108 is moved up into position. The temperature of the lubricant should be about 210° F. at the start of the test period, or the bearings should be run in for a while at a low load until approximately that temperature is reached, before starting the reading.

The ratchet wheel shaft 38 is then swung into place and the wheel 62 revolved in the proper direction to show an initial registration of zero on the gauge 81. The load applying arm 33 is next moved into place to bring the pawl 61 into engagement with the teeth 63 of the ratchet wheel 62 and the motor 12 is started up.

The load, as indicated on gauge 81, is rapidly run up to 300 lbs., at which point the load applying arm 33 is disengaged and the bearings are run in for 3 minutes at this load. The ratchet arm is then reengaged and the load run up to 500 lbs. for 1 minute, the ratchet arm disengaged and the torque noted. At the end of the 50th second of this minute period, the ratchet arm is reengaged and the load increased by 250 lbs. up to 750 lbs., at which point the ratchet arm is again disconnected and the machine run for another 1 minute period at this load, again recording the torque.

As the load is increased by 250 lb. increments, it will be found that at a very definite load during the test, the jaw load gauge will fall off by a very noticeable amount by the end of one of the 1 minute periods. This normally is accompanied by a sharp "pop-up" in the torque gauge, which in the average case, will jump from a reading of say 30 to anything from 50 to 150, sometimes accompanied by "squealing". With certain lubricants, it will be noted that pop-up occurs at a relatively low load, while with others it does not occur until materially higher loads have been reached. In order to make a fair comparison of the rate of metal wear after pop-up, it is necessary to make a wear test at a predetermined total gauge load, which is the same for each test. A convenient total gauge load at which to start measuring the rate of wear is 1500 lbs. Other gauge loads may be taken as the standard, depending upon the particular type of oil being tested.

If 1500 lbs. is used as the starting load, it is advisable to continue the intermittent loading beyond the pop-up point until a 1500 lb. gauge load is reached. After pop-up, intermittent loading is continued, using only 30 second time intervals for each loading point after pop-up occurs.

If pop-up occurs at exactly 1500 lbs. gauge load, at least 1 full minute should elapse from the time of pop-up until timing for rate of wear is begun. Should pop-up occur at loads greater than 1500 lbs. gauge, as at 2000 or 2250 lbs., it is necessary to work these loads back to 1500 lbs., stepping the loading mechanism down by hand in the same manner that it is stepped up on the intermittent load test.

After the load has worked up to 1500 lbs., or the machine is run for 1 minute at 1500 lbs., as in the case of pop-up at 1500 lbs., or the load has been worked back to 1500 lbs., as in the case of oils popping up above 1500 lbs., the time is noted and the ratchet wheel 62 is marked at some convenient point, as by means of a pencil laid across the loading arm 36 or 37. It is also convenient to have the ratchet wheel 62 laid off in divisions of 10 teeth each, as by means of indicia lines 120 (Fig. 1).

At the start of the wearing test, with the gauge load at 1500 lbs., the ratchet arm 33 is disengaged and the wheel 62 is turned up by hand to maintain the load reading constant during a three minutes operation. At the end of each minute of the three minute test period, the ratchet wheel is marked by pencil and the number of teeth between the successive marks is noted. The number of teeth so noted is a direct measure of the amount of wear between the bearing surfaces of the pin 84 and blocks 87 and 88. An amount of wear corresponding to 60 teeth over the three minute test period may be considered as indicating good E. P. value.

As best shown in Fig. 11, most of the wear occurs on the pin 84, the amount of wear being indicated by the reduced diameter of the cylindrical bearing surface 121. The actual amount of wear can, of course, be calipered, but it can equally well be expressed in terms of "number of teeth", as counted on the ratchet wheel. From the number of teeth and the wear, expressed in inches, corresponding to one tooth, the actual wear in inches may be easily calculated, if desired, without the use of calipers.

As will be readily appreciated, the E. P. value of different oils will be indicated by the amount of wear produced during the 3 minutes test period, the lower the E. P. value, the greater the amount of wear and vice versa.

As an example of what may be expected with an oil having a good established service record on car gears calling for an E. P. lubricant, such an oil shows an E. P. film rating of 100 teeth in 3 minutes.

Another oil with a good service record on hypoid type gears showed a film strength of 1250 lbs. gauge load at the time of pop-up, and less than 50 teeth on the E. P. film rating 3 minute test.

Another oil, supposedly E. P. but with a bad service record on hypoid type gears, showed a fluid film strength of 1000 lbs. gauge load but gave an E. P. film rating of over 250 teeth on successive tests, indicating inferior E. P. value.

In the case of another lubricant which passed the Gleason test with a high rating, the product showed a film strength of 2000 lbs. gauge load and an E. P. film rating of 60 to 65 teeth on four repeat tests.

With numerous lubricants containing a certain type of oiliness addition agents, it will be noted that normal pop-up is extremely hard to detect, even though noticeable wear is observed at the point where normal pop-up should occur. Such lubricants are more easily studied by first diluting with a certain proportion of an inert diluent, such as an oil of no E. P. value. For instance, kerosene or any transmission oil having no E. P. value may be added in any desired proportion and the E. P. film rating of the thus diluted lubricant determined in the manner above described.

Tests on a large number of E. P. lubricants have demonstrated the ability by some lubricants to reestablish a full fluid film condition during the E. P. test period above described. In one case, for instance, the lubricant showed a wear of 62 teeth during the three minute test period, but, upon continuing the test, showed only 23 teeth wear for the subsequent three minutes. This indicates a tendency to reestablish full fluid film.

In order to get a more accurate indication of E. P. value, the lubricant in question was diluted with 67% of ordinary water white kerosene distillate and tests run on the diluted product. Three repeat tests showed satisfactorily consistent evaluation figures.

It will be understood that as many variables as possible should be eliminated in making comparative tests on different lubricants. It is preferable, for instance, in carrying out the test methods above described to revolve the test bearing pin at a definite speed, such as 290 R. P. M., and to start with the lubricant at a definite temperature, such as 210° F. Although the starting point for the E. P. film test has been referred to as 1500 lbs. gauge load, other gauge loads and other speeds may be employed, depending upon the diameter of the bearing pin and other factors.

I have found, however, that with a testing machine such as described, it is more difficult to locate the "pop-up" point if speeds lower than 290 R. P. M. are used. Speeds above 380 R. P. M. are unsatisfactory because of the tendency of many lubricants to produce torque seizure in going into the E. P. film, and also due to formation of a slip-film condition similar to that observed when a cutting drill is turned so fast that it will not cut.

Extreme pressure products are characterized by their ability to resist welding of the bearing surfaces. The action of the lubricant in the test machine above described during the E. P. test period is an indication of its ability, when used on hypoid gears, to resist scuffing of the gears. Heretofore, to the best of my knowledge, no method has been devised, for accurately testing lubricants for E. P. value in advance of, or in lieu of placing the lubricant in actual service.

By the application of my testing method, it is possible from the E. P. and fluid film ratings of individual oils to compound mixtures of such oils in proportions to give desired E. P. and full fluid film ratings. In this way, oils may be compounded to obtain products having certain desired characteristics.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of testing lubricants, which comprises rotating a cylindrical member between plane bearing surfaces under increasing bearing load, measuring the load and torque up to the point where the torque suddenly increases, continuing the rotation of said cylindrical member under predetermined increased load for a period of time and measuring the amount of wear produced on the bearing surfaces.

2. The method of testing lubricants for E. P. value, which comprises relatively rotating bearing surfaces immersed in a lubricant to be tested under incremental increases in bearing load until the point of incipient seizure is reached, adjusting the bearing load to a predetermined figure, maintaining said load substantially constant during a definite time period and determining the rate of wear during such period.

3. The method of testing lubricants, which comprises diluting a given lubricant with an inert petroleum distillate in a definite proportion, rotating a bearing member between plane bearing surfaces while immersed in said diluted lubricant, applying increased loads to said bearing surfaces until the point of incipient seizure of said surfaces is reached, bringing the load to a predetermined amount thereafter, maintaining said load substantially constant during a continued test period of a definite duration, and measuring the amount of wear between said surfaces and pin during such continued test period.

4. The method of testing a lubricant for its E. P. value, which comprises running a bearing member between bearing surfaces in a full fluid film of said lubricant, increasing the applied bearing load by increments until a sudden increase in the torque between said bearing member and surfaces occurs, adjusting the applied load to a predetermined amount not greater than that at which the sudden torque increase occurred, continuing to run said bearing member while keeping the load constant at said predetermined amount and determining the rate of wear during such period.

FREDERICK A. FAVILLE.